United States Patent

Hodder

[15] 3,651,277

[45] *Mar. 21, 1972

[54] INFORMATION RECORDING AND REPRODUCTION APPARATUS WITH SIGNAL DISPERSION AND RESTORATION FILTERS

[72] Inventor: Wayne Kassell Hodder, Glendora, Calif.

[73] Assignee: Bell & Howell Company, Chicago, Ill.

[ * ] Notice: The portion of the term of this patent subsequent to Sept. 22, 1987, has been disclaimed.

[22] Filed: Feb. 10, 1970

[21] Appl. No.: 10,167

Related U.S. Application Data

[63] Continuation-in-part of Ser. No. 643,119, June 2, 1967, Pat. No. 3,530,256.

[52] U.S. Cl. ..........179/100.2 K, 340/174.1 G, 340/174.1 H

[51] Int. Cl. ..........G11b 5/02

[58] Field of Search ..........178/DIG. 3; 179/15.55, 100.2 K; 340/174.1 B, 174.1 G, 174.1 H; 346/74 MP

[56] References Cited

UNITED STATES PATENTS 3,207,854 9/1965 Johnson ..........179/100.2

*Primary Examiner*—Bernard Konick
*Assistant Examiner*—J. Russell Goudeau
*Attorney*—Luc P. Benoit

[57] ABSTRACT

Apparatus for recording and reproducing time-varying electric information signals having means for recording information corresponding to elemental fractions of the electric information signals on extended sections of a recording medium, and means for converting information recorded on extended sections of the recording medium into elemental fractions of reproduced information signals, whereby the energy of momentary error signals is dispersed relative to the elemental fractions of the reproduced information signals.

7 Claims, 9 Drawing Figures

INVENTOR.
WAYNE K. HODDER

INVENTOR.
WAYNE K. HODDER

INVENTOR.
WAYNE K. HODDER

INVENTOR.
WAYNE K. HODDER

INFORMATION RECORDING AND REPRODUCTION APPARATUS WITH SIGNAL DISPERSION AND RESTORATION FILTERS

CROSS-REFERENCE TO RELATED APPLICATIONS

This is a Continuation-in-Part of my U.S. Pat. Application Ser. No. 643,119, INFORMATION RECORDING AND REPRODUCTION APPARATUS WITH SIGNAL DISPERSION AND RESTORATION FILTERS, filed June 2, 1967, issued as U.S. Pat. No. 3,530,256 on Sept. 22, 1970 and assigned to the assignee of the subject patent application.

BACKGROUND OF THE INVENTION

1. Field of the Invention

The subject invention relates to information recording and reproduction and, more particularly, to the reduction of impulse-like or momentary disturbances in information recording and reproduction.

2. Description of the Prior Art

The art of recording and reproducing electric information signals has made tremendous progress in recent years. However, there still exists a need for economical equipment which effects a suppression or material reduction of impulse-like or momentary disturbances without requiring extensive modifications of the basic recording equipment.

Throughout the years, certain types of recording equipment have become established and are favored because of their efficiency, relative simplicity and reliability. An example which readily comes to mind is the familiar type of magnetic recording equipment in which information presented in the form of electric signals is recorded by means of at least one magnetic recording head on moving magnetic tape and is reproduced therefrom with the aid of one or more playback heads, as the case may be. Functionally analogous recording apparatus have also been developed and are well known in the art.

The performance of these types of recording equipment is frequently impaired by impulse-like or other momentary disturbances which occur frequently, mostly in random fashion. One source of disturbances of this type are imperfections in the recording medium. Another disturbance is known to come about from momentary random imperfections in the recording or the playback process. Switching transients provide further momentary disturbances. For instance, in magnetic recording tape apparatus, impulse-like error signals are produced by tape blemishes, by undesirable momentary head-to-tape separations caused by tape asperities, and also by switching transients if multiple-head arrangements are employed.

It has long been recognized that impulse-like error signals or noises are among the most objectionable forms of interference in the reproduction of recorded information. For example, if the information is of the audible type, this kind of interference can be very annoying and tiresome to the listener and can in advanced stages virtually obliterate parts of the information. These problems are further compounded if the information is in the form of video signals, since impulse noise is particularly annoying if presented in visible form. Also, the familiar synchronization components of video equipment are by their nature sensitive to pulsed information and are easily misguided by spurious pulses. Similar problems are present with data processing equipment which relies in its operation on the evaluation of recorded pulses, or instrumentation equipment which has to conform to very stringent standards of performance.

For instance, elements of digital information are frequently lost during recording on magnetic recording tapes or discs having local imperfections, such as pin holes or other flaws, in the recording medium layer. Great efforts are, therefore, undertaken by tape or disc manufacturers to assure the freedom from local imperfections of recording tapes or discs sold for computer or similar purposes. These efforts, in turn, lead to a considerable increase in price and required quality control of the recording medium.

While these problems have been recognized for a long time, they have not so far found an economic solution in the sense mentioned above in the information recording and reproduction art. Rather, efforts have been directed to reduce the influence of pulse noise in data transmission links or systems ( see Wainwright, *On the Potential Advantage of a "Smearing, De-Smearing" Filter Technique in Overcoming Impulse Noise Problems in Data Systems*, 6th National Communications Symposium (1960), pp. 233–41; and Gibson, *A Highly Versatile Corrector of Distortion and Impulse Noise*, Proc. of the National Electronics Conference (1961), pp. 543–56), and in radar installations.

SUMMARY OF THE INVENTION

The subject invention provides novel apparatus which may include conventional recording and playback equipment but in which impulse-like disturbances are suppressed or at least reduced to tolerable minima.

The subject invention resides in apparatus for producing a record of electric information signals, and for substantially reproducing said electric information signals from said record, comprising filter means for dispersing successive elemental fractions of said information signals, including delay line means having taps weighted substantially in accordance with a function of $$J_n\ (K)$$

wherein K is a predetermined constant,

J is a Bessel function of the first kind, $n$ designates Bessel function order, and $J_n$ (K) proceeds in accordance with Bessel coefficients of sideband components of angle-modulated signals, a recording medium, means connected to said filter means for recording said dispersed elemental fractions on said recording medium, means for playing back said dispersed elemental fractions from said recording medium, with said played-back dispersed elemental fractions including spurious signals of momentary duration, and means connected to said playback means for substantially restoring said electric information signals from said played-back dispersed elemental fractions, and for diffusing said spurious signals.

BRIEF DESCRIPTION OF THE DRAWINGS

Like reference numerals in the various figures designate like or functionally equivalent parts.

DESCRIPTION OF PREFERRED EMBODIMENTS

Figure 1:
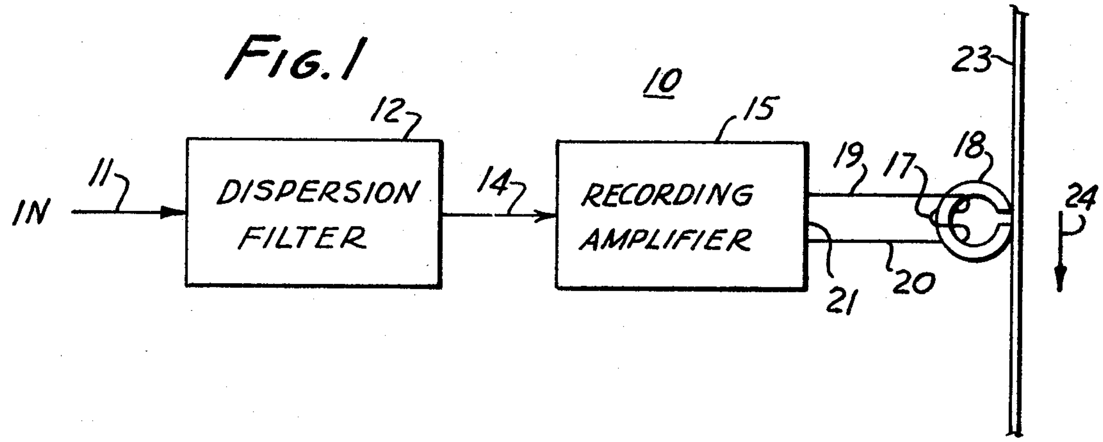
FIG. 1 is a block diagram of a recording apparatus according to a preferred embodiment of the invention.

The recording apparatus 10 shown in FIG. 1 includes input means 11 for receiving a time-varying electric information signal. This signal may, for instance, be an electric signal representing data in, for example, analog, digital or pulsed form, an electric signal representing sound, such as speech or music, for information, education or entertainment, or an electric video signal with or without synchronization information, or other intelligence.

The input means 11 are connected to a dispersion filter 12 which converts the information signal received at the input means 11, hereinafter referred to as first information signal, into a corresponding or second electric information signal applied to a line 14.

Figure 3:
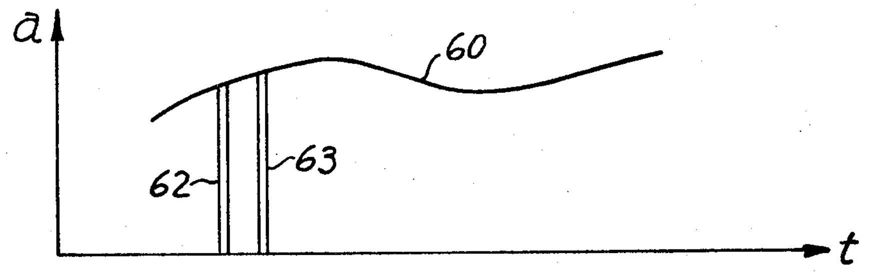
FIGS. 3 to 5 are amplitude-versus-time plots illustrating operational phases of preferred embodiments according to the subject invention.

As is the case with time-varying electric signals, the first information signal can be considered as being broken down into time points or elemental fractions that represent bits or quanta of the first information signal. By way of illustration, FIG. 3 shows two elemental fractions 62 and 63 of an input or first information signal 60. The dispersion filter 12 is effective to disperse these elemental fractions over periods of time that are extended relative to the original duration of these elemental fractions in the first information signal 60. The result is a provision of the mentioned second information signal in which time points of the first signal are present in an extended or dispersed fashion, whereby elemental fractions of the second information signal contain information corresponding to different elemental fractions of the first information signal.

Figure 4:
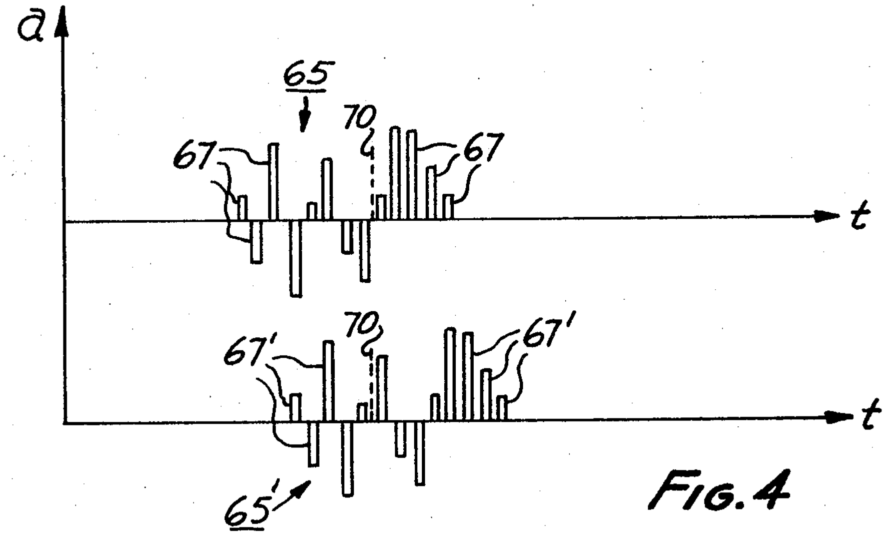

This is illustrated in FIG. 4 which shows a first dispersion pattern 65 produced by a dispersion of the elemental fraction 62, and a second dispersion pattern 65′ produced by a dispersion of the elemental fraction 63 in the filter 12. The various dispersion patterns are typically recorded in the same recording channel, although they are shown separately in FIG. 4 for the sake of a clearer illustration. The relative amplitudes and polarities of the elemental fractions or constituents 67 and 67′ of the dispersion patterns 65 and 65′ depend on parameters of the filter 12, as will become apparent in the course of this description.

The line 14 is connected to a recording amplifier 15 which may be of a conventional design employed in the recording of electric information signals, and which has the required bandwidth for the amplification of the defined second signal provided by the dispersion filter 12.

The amplified second signal is applied to a coil 17 of a conventional magnetic recording head 18, by a pair of leads 19 and 20 which are connected to the output 21 of the recording amplifier 15. In the usual manner, the recording head 18 converts its input signal, here the amplified second signal, into corresponding magnetic pulsations which are recorded on a conventional magnetic recording tape 23 that is moved by a conventional drive (not shown) in the direction of arrow 24, and that has the magnetic head 18 operatively coupled thereto. To simplify the drawing, collateral features, such as high frequency energization of the tape, have not been shown. It should be understood at this juncture that a magnetic recording disc or drum, a photographic film, or another suitable recording medium may be employed instead of the tape 23.

One result of this recording operation is that elemental fractions, bits or quanta 62 and 63 of the first information signal are recorded on extended sections of the tape 23, rather than being recorded on points or elemental regions thereof. To use descriptive language, this may be referred to as "defocusing" or "smearing" of the first information signal. Points or elemental areas of the tape 23 then contain superimposed recorded information 67 and 67′ pertaining to different elemental fractions, bits or quanta of the first information signal.

Figure 2:
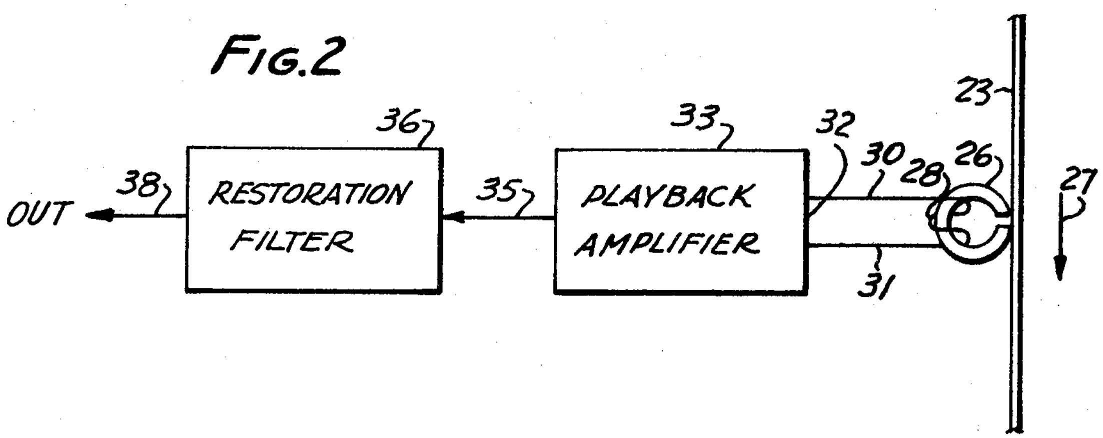
FIG. 2 is a block diagram of a playback apparatus according to a preferred embodiment of the invention.

The apparatus shown in FIG. 2 may be employed to play back the information stored on the tape 23 and to reproduce the above mentioned first information signal.

To this effect, the tape 23 is moved, by a drive (not shown), past a magnetic playback head 26 in the direction of arrow 27. With the aid of a coil 28, the playback head 26 converts the information recorded on the tape 23 into a corresponding information signal, hereinafter referred to as the third information signal.

This third information signal, which is applied to leads 30 and 31, may, and in practice typically will, contain error signals of momentary duration or pulselike noise.

These error signals may be of various origin. For example, they may be due to blemishes on the tape 23, such as imperfections in the magnetizable coating of the tape produced during manufacture, use or handling of the tape. Momentary head-to-tape separations, such as separations caused by tape asperities, may also be responsible for pulselike error signals. In many modern applications, multiple recording and playback heads are used, as is for instance the case in many well-known video tape recording machines. Switching transients occur frequently in these types of recording machines, since the different heads are sequentially switched into circuit. These transients introduce undesirable spikes which are reflected in the played-back information signal. By way of example, a momentary error signal 70 is shown in the dispersion patterns 67 and 67′ of FIG. 4. This error signal is played back with the dispersion patterns 67 and 67′ and is applied to the leads 30 and 31.

The leads 30 and 31 are connected to the input 32 of a conventional playback amplifier 33 which, in a customary fashion, amplifies not only the actual information contained in the above mentioned third signal, but also the mentioned error signals.

These error signals are very undesirable for the reasons mentioned initially. Accordingly, the line 35 which conducts the amplified third information signal is connected to what is styled here a restoration filter 36. This restoration filter is an inverse replica of the dispersion filter 12. Mathematicallyit gives the conjugate of the frequency response of the dispersion filter. For the purpose of analysis, its function may be described as composed of two simultaneously performed roles.

First, the restoration filter 36 restores the above mentioned first signal by reducing the duration of dispersion patterns 65 and 65′ contained in the amplified third signal so that the previously mentioned elemental fractions, bits or quanta 62 and 63 of the first signal are reconstructed.

Secondly, the restoration filter 36 extends the duration of momentary error signals or pulselike noise 70 contained in the amplified third signal.

Figure 5:
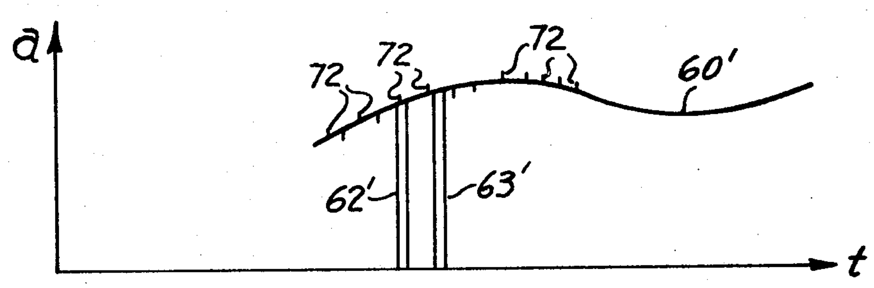

The result is a signal 60′ which, as indicated in FIG. 5, corresponds closely to the signal applied at input means 11 in FIG. 1 and in which the energy of momentary error signals is dispersed. The elemental fractions 62′ and 63′ of the output signal 60′ are the reconstituted fractions 62 and 63 of the input signal 60, and the small spikes 72 represent the dispersed energy of the error signal 70. It should be understood at this juncture that the error signal 70 may be present in the form of a momentary signal or a momentary interruption in the signal patterns 65 and 65′.

For practical purposes, this dispersion of the error signal amounts to a suppression of the noise here under consideration, at least down to tolerable levels.

The resulting signal provided by the operation of the restoration filter 36 is applied to an output line 38, which may be connected to further data processing equipment (not shown), such as a loudspeaker arrangement, video display apparatus or data indicating or computer equipment, as the case may be.

In theory an infinite number of filter elements in the dispersion filter 12 and in the restoration filter 36 would be required to obtain an ideal dispersion and subsequent signal restoration within the desired bandwidth of the system. Since this is physically unattainable, various methods have been developed for the design of practical filters, as can be seen from the above mentioned Wainwright and Gibson articles, and also from Kallmann, *Transversal Filters*, Proc. I.R.E., July 1940, pp. 302–10, Ammerman, *A new Approach to the Synthesis of Transversal Filters*, National Electronics Conference, Vol. XI, 1955, pp. 669–77, Bellows and Graham, *Experimental Transversal Equalizer for TD-2 Radio Relay System*, The Bell System Technical Journal, Vol. XXXVI, No. 6, Nov. 1957, pp. 1429–50.

The subject invention provides recording-playback systems including dispersion and restoration filters designed on the basis of established mathematical theory. More specifically, the invention employs, filters designed with the aid of mathematic analyses established in the field of angle modulation. It should, of course, be understood at this juncture that the function of the dispersion and restoration filters herein under discussion has nothing to do with angle modulation of radiofrequency waves. However, I have discovered that mathematical equations employed to analyze and explain angle modulation may be adapted to the design of workable dispersion and restoration filters.

An example of such an adaptation will now be described in detail with the aid of repeated references to the book of Standford Goldman, FREQUENCY ANALYSIS, MODULATION AND NOISE (McGraw Hill, 1948), which will hereinafter be referred to as Goldman.

The gain of a filter with a flat amplitude response in the frequency domain may be expressed as $$G=\sin[\omega t+\theta(\omega)] \quad (1)$$

wherein $G$ = gain, $\omega$ = angular frequency, $t$ = time, $\theta(\omega)$ = frequency-dependent phase angle.

This resembles the following equation which expresses the sinusoidal course of a high-frequency carrier wave (see Goldman, p. 146).

$$a=A\sin(\omega t+\phi) \quad (2)$$

wherein $a$ = instantaneous signal strength, $A$ = signal amplitude, $\omega$ = angular carrier frequency, $t$ = time, $\phi$ = relative phase angle.

Frequency modulation of the carrier wave of equation (2) may be expressed (see Goldman, p. 148) as $$a=A\sin[\omega t+(\Delta F/v)\sin\omega_m t+\theta] \quad (3)$$

wherein $a$ = instantaneous signal strength, $A$ = signal amplitude, $t$ = time $\omega$ = angular carrier frequency, $\omega_m$ = angular modulating signal frequency, $v$ = modulating signal frequency, $\Delta F$ = peak frequency deviation, $\theta$ = phase angle.

In accordance with a preferred embodiment of the subject invention, the factor $[\omega t+\Delta F/v\sin\omega_m t+\theta]$in equation (3) serves as a basis for a modification of the equation (1).

More specifically, the factor $\Delta F/v$, known as modulation index in radio engineering, is equated to a constant K, and the factor "$\sin\omega_m t$" is equated to "$\sin(\omega T)$" with T being another constant. The phase angle $\theta$ is set equal to zero.

In consequence, the phase angle $\theta(\omega)$ in equation (1) is written as $$\theta(\omega)=K\sin(\omega T) \quad (4)$$

and equation (1) becomes $$G=\sin[\omega t+K\sin(\omega T)] \quad (5)$$

Applying to equation (5) the Bessel function expansions employed to frequency-modulation analysis (see Goldman, pp. 149, 150 and 417 to 419) we may write $$\begin{aligned}G= & \\ & J_o(K)\sin(\omega T)\\ & +J_1(K)\sin[\omega(t+T)]-J_1(K)\sin[\omega(t-T)]\\ & +J_2(K)\sin[\omega(t+2T)]+J_2(K)\sin[\omega(t-2T)]\\ & +J_3(K)\sin[\omega(t+3T)]-J_3(K)\sin[\omega(t-3T)]\\ & +J_4(K)\sin[\omega(t+4T)]+J_4(K)\sin[\omega(t-4T)]\\ & +J_5(K)\sin[\omega(t+5T)]-J_5(K)\sin[\omega(t-5T)] \quad (6)\\ & +J_6(K)\sin[\omega(t+6T)]+J_6(K)\sin[\omega(t-6T..., \text{etc.}\end{aligned}$$

wherein J indicates Bessel functions of the first kind and the subscripts indicate the order of the particular Bessel function in accordance with mathematical convention. It will be recalled in this connection that $J_n(K)$ for $n=1$ through 6, etc., corresponds to the so-called Bessel coefficients of the angle-modulation sideband components (see Goldman, p. 150 for FM, and p. 152 for PM).

Figure 6:
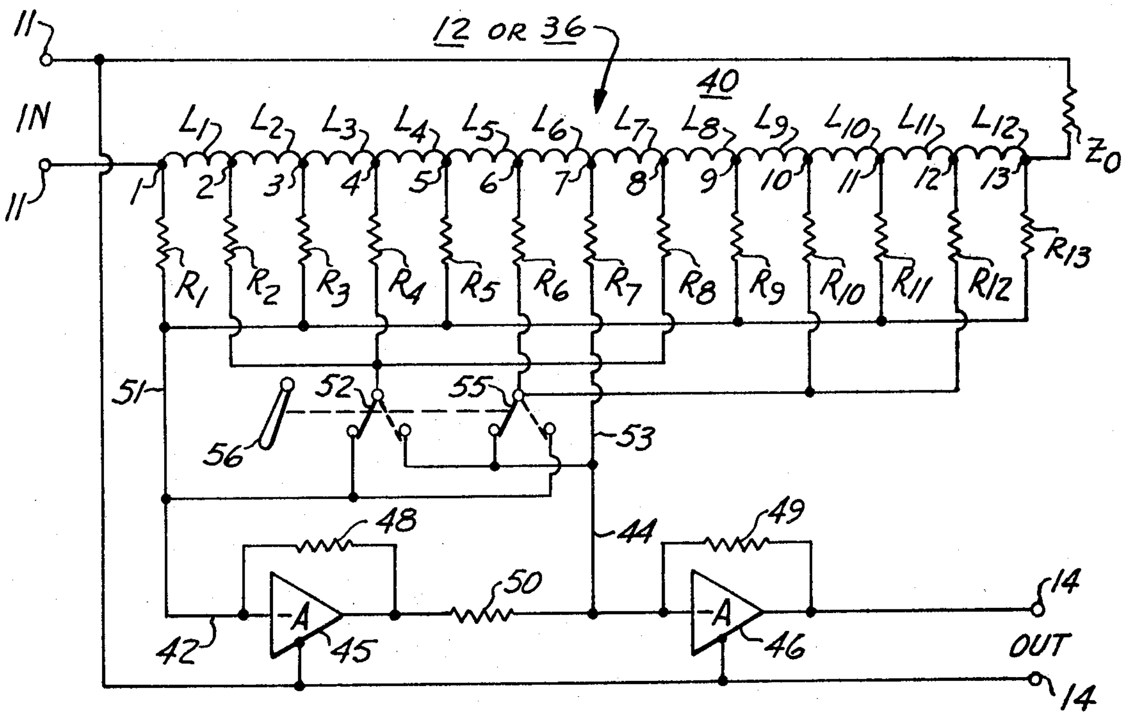
FIG. 6 is a diagram of a filter circuit designed in accordance with further preferred embodiments of the subject invention and useful in the system of FIGS. 1 and 2.

An example of the use of the equation (6) in the design of a dispersion filter 12 for the recording apparatus of FIG. 1 will now be developed with the aid of FIG. 6.

According to FIG. 6 the filter 12 includes a 600 ohm, 100 microsecond delay line 40 which includes a 600 ohm termination resistor $Z_o$ and is composed of sections $L_1$ through $L_{12}$ and resistors $R_1$ through $R_{13}$ connected to delay line taps 1 through 13. Since there are twelve L-sections, the time delay of each section is 8.333 microseconds in the illustrated example of FIG. 6. In terms of equations (4), (5) and (6), the constant T used in those equations denotes the delay of each delay line section and becomes thus 8.333 microseconds in the instant situation.

The Bessel functions $J_o(K)$, $J_1(K)$, $-J_1(K)$, $J_2(K)$, $J_3(K)$, $-J_3(K)$, $J_4(K)$, $J_4(K)$, etc., of equation (6) are employed to determine the resistances of the resistors $R_1$ through $R_{13}$, which present the so-called weights of the delay line taps 1 through 13.

The particular taps associated with the functions $J_1(K)$, $-J_1(K)$, $J_2(K)$, etc., are identified on the basis of the factor associated in the equation (6) with the particular T in the parenthetical expression including that T. If we associate $J_o(K)$ with a tap of $n=0$, then a positive sign in the parenthetical expression which includes T denotes a tap closer to the delay line input 11 than the tap of $n=0$, while a negative sign in that parenthetical expression denotes a tap farther away from the delay line input than the tap of $n=0$. Accordingly, $+T$ in the $+J_1(K)$ term denotes a tap of $n=-1$; $-T$ in the $-J_1(K)$ term denotes a tap of $n=+1$, while $+2T$ in the first $J_2(K)$ term denotes a tap of $n=-2$, and $-2T$ in the second $J_2(K)$ term denotes a tap of $n=+2$, and so forth.

To accommodate negative taps, it is necessary to associate $J_o(K)$, $n=0$, with the center tap $n_c$ which may be determined as $$n_c=N+1/2 \quad (7)$$

wherein $N$ is an odd integer denoting the total number of taps.

Inserting the total number of 13 taps of the embodiment of FIG. 6 as the term N into the equation (7) we find that the weight $J_o(K)$ is to be associated with the tap 7 in the filter of FIG. 6. The following can then be said about the remaining taps:

$$\begin{aligned}&n_c-6=\text{tap }1 && n_c-5=\text{tap }2\\ &n_c-4=\text{tap }3 && n_c-3=\text{tap }4\\ &n_c-2=\text{tap }5 && n_c-1=\text{tap }6\\ &n_c+1=\text{tap }8 && n_c+2=\text{tap }9\\ &n_c+3=\text{tap }10 && n_c+4=\text{tap }11\\ &n_c+5=\text{tap }12 && n_c+6=\text{tap }13 \quad (8)\end{aligned}$$

wherein $n_c$ denotes the center tap 7.

Applying these definitions to the terms of equation (6), we may write $$\begin{aligned}&W(n_c)=J_o(K)\\ &W(n_c+1)=-J_1(K);\ W(n_c-1)=+J_1(K)\\ &W(n_c+2)=+J_2(K);\ W(n_c-2)=+J_2(K)\\ &W(n_c+3)=-J_3(K);\ W(n_c-3)=+J_3(K)\\ &W(n_c+4)=+J_4(K);\ W(nc-4)=+J_4(K)\\ &W(n_c+5)=-J_5(K);\ W(n_c-5)=+J_5(K)\\ &W(n_c+6)=+J_6(K);\ W(n_c-6)=+J_6(K)\\ &..., \text{etc.} \quad (9)\end{aligned}$$

wherein $J$ indicates Bessel functions of the first kind, the subscripts 0 through 6 indicate the order of the particular Bessel function, $K$ is a predetermined constant, $W$ denotes tap weight, and the parenthetical expressions associated with $W$ identify the tap order, with $n_c$ being $(N+1)/2$; where $N$ is the total odd number of taps.

The constant K is chosen with the aid of a conventional table of Bessel functions of the first kind. The first criterion of selection is the provision of a distribution of the input signal energy over the various delay line tap outputs. This in general favors large values of $K$. The second criterion is an avoidance of uneconomically large numbers of taps, which limits the value of $K$ on a practical basis.

The filter illustrated in FIG. 6 has been designed with a value of $K=4.9$. Inserting with the aid of a Bessel function table the corresponding Bessel function values into the equation (9) and organizing the result in terms of taps 1 through 13, we obtain the following weights for these taps:

| | |
|---|---|
| Tap 1=+0.12 | Tap 8=+0.315 |
| Tap 2=+0.25 | Tap 9=+0.08 |
| Tap 3=+0.385 | Tap 10=−0.38 |
| Tap 4=+0.38 | Tap 11=+0.385 |
| Tap 5=+0.08 | Tap 12=−0.25 |
| Tap 6=−0.315 | Tap 13=+0.12 |
| Tap 7=−0.21 | |

(10)

The next step resides in a selection of a resistance value which is divided by the weights tabulated in (10) to obtain the resistances of $R_1$ through $R_{13}$. High resistance values would be preferred from the point of view of a light loading of the delay line 40. Increasingly high resistance values, however, lead to a diminution of the input signal strengths at the inverting amplifiers 45 and 46 to the detriment of acceptable signal-to-noise ratios.

By way of compromise between these criteria, I chose for the illustrated prototype of FIG. 6 a resistance of 30,000 ohms. Dividing this resistance by the weights tabulated in (10) we approximately obtain the following values for resistors $R_1$ through $R_{13}$:

| Kilohms | Kilohms |
|---|---|
| $R_1$=250 | $R_8$=95 |
| $R_2$=120 | $R_9$=370 |
| $R_3$=78 | $R_{10}$=79 |
| $R_4$=79 | $R_{11}$=78 |
| $R_5$=370 | $R_{12}$=120 |
| $R_6$=95 | $R_{13}$=250 |
| $R_7$=143 | |

(11)

In the case of a non-ideal delay line, some empirical adjustments may be made to account for the fact that an ohmic resistance exists along the sections $L_1$ through $L_{12}$. Accordingly in a practical prototype I chose for the resistors $R_1$ through $R_{13}$ the following empirical values listed in table (12) rather than the exact calculated values tabulated in (11). It will, however, be appreciated that a close relationship exists between the calculated values and the adjusted values listed in table (12).

| Kilohms | Kilohms |
|---|---|
| $R_1$=250 | $R_8$=90 |
| $R_2$=119 | $R_9$=348 |
| $R_3$=77 | $R_{10}$=73 |
| $R_4$=77 | $R_{11}$=72 |
| $R_5$=360 | $R_{12}$=110 |
| $R_6$=92 | $R_{13}$=227 |
| $R_7$=136 | |

(12)

it now remains necessary to take a step which accounts for the positive and negative signs indicated for taps 1 through 13 in the tabulation (10). To this end a pair of operational inverting amplifiers 45 and 46 are provided in connection with the filter 12. The operational amplifiers 45 and 46 may be of conventional design and include a feedback resistor 48 and 49, respectively. The two inventing amplifiers 45 and 46 are connected in series through a resistor 50. Accordingly, a positive signal applied to the lead 42 is twice inverted and thus appears as a positive signal at the filter output 14. On the other hand, a positive signal applied to the lead 44 is inverted once by the amplifier 46 and appears as a negative signal at the filter output 14.

The above tabulation (10) requires that signals derived from the taps 1, 2, 3, 4, 5, 8, 9, 11, and 13 be provided at the output 14 at a relatively positive value. Accordingly, the resistors $R_1$, $R_3$, $R_5$, $R_9$, $R_{11}$, and $R_{13}$ are connected through a lead 51 and the lead 42 to the series-connected inverting amplifiers 45 and 46. To permit an operation of the filter of FIG. 6 as a restoration filter as described below, the resistors $R_2$, $R_4$, and $R_8$ are connected to the lead 42 through a switch 52, when this switch 52 is in its illustrated solid-line position.

Tabulation (10) further requires that signals derived from the taps 6, 7, 10, and 12 be provided at the output 14 at a relatively negative value. Accordingly, the resistor $R_7$ is connected to the second inverting amplifier 46 through a lead 53 and through the lead 44. To permit an operation of the filter of FIG. 6 as a restoration filter, the resistors $R_6$, $R_{10}$, and $R_{12}$ are connected to the lead 44 through a switch 55, when this switch 55 is in its illustrated solid-line position.

Figure 7:
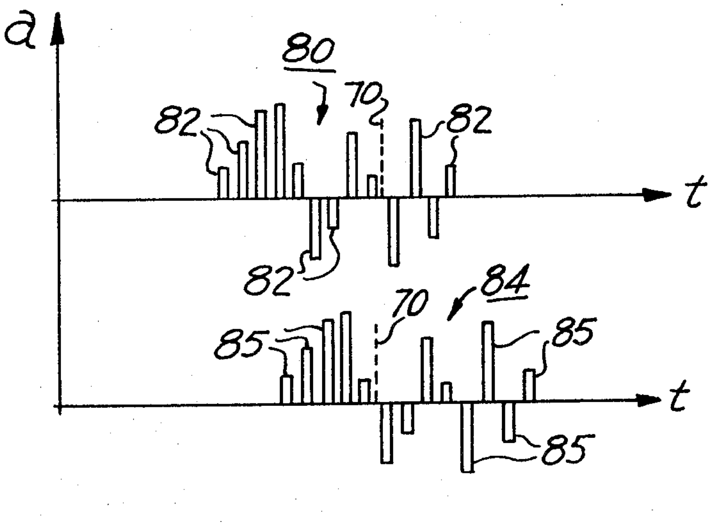
FIG. 7 is an amplitude-versus-time plot depicting further operational phases of preferred embodiments according to the subject invention.

The switches 52 and 55 are ganged and are jointly actuated by manipulation of a toggle 56 or in a similar manner. To have the filter of FIG. 6 operate as a dispersion filter 12, the switches 52 and 55 are actuated to their positions indicated in solid lines. The elemental fraction 62 of the signal 60 (see FIG. 3) is then dispersed into a pattern 80 as shown in FIG. 7. The relative amplitudes and polarities of the constituent elemental fractions 82 of the pattern 80 correspond to values of resistors $R_1$ to $R_{13}$ indicated above in the tabulation (12) and to the selective connection of these resistors to the series-connected amplifiers 45 and 46 or to the amplifier 46 alone as outlined above. The same is true with respect to the dispersion pattern 84 (see FIG. 7) of the elemental fraction 63 of the input signal 60 (see FIG. 3) and the elemental fractions or constituents 85 thereof.

The pattern 80 and 84, and other dispersions of elemental fractions of the input signal 60, are again recorded by the equipment 15 and 18 on the tape 23 and are subsequently played back by the equipment 26 and 33 (see FIGS. 1 and 2).

The filter of FIG. 6 which so far has served as the dispersion filter 12 may now be operated as the restoration filter 36 by connecting the filter input 11 to the output 35 of the playback amplifier 33 and by actuating the switches 52 and 55 to their second positions illustrated in dotted lines in FIG. 6. In this case the resistors $R_1$, $R_3$, $R_5$, $R_6$, and $R_9$ through $R_{13}$ are connected to the amplifier 45, and the resistors $R_2$, $R_4$, $R_7$, and $R_8$ are connected to the amplifier 46. This means that signals derived from the taps 2, 4, 7 and 8 are inverted (−), while signals derived from the taps 1, 3, 5, 6, and 9 through 13 are not inverted (+). The following polarities may thus be assigned to the signals derived from the taps 1 through 13 when the filter of FIG. 6 operates as a restoration filter:

| | |
|---|---|
| Tap 1=+ | Tap 8=− |
| Tap 2=− | Tap 9=+ |
| Tap 3=+ | Tap 10=+ |
| Tap 4=− | Tap 11=+ |
| Tap 5=+ | Tap 12=+ |
| Tap 6=+ | Tap 13=+ |
| Tap 7=− | |

(13)

This represents the polarities indicated in table (10), but in reverse order. Since the resistor values are not changed, the filter of FIG. 6 with the switches 52 and 55 in their second positions (dotted lines) may be termed an inverse replica of the filter of FIG. 6 with the switches 52 and 55 in their first positions (solid lines), providing a conjugate frequency response. This being the case, the dispersion patterns 80 and 84 of FIG. 7 are converted to the restored signal components 62' and 63' while momentary error signals 70 are dispersed in the form of low-energy noise 72 as shown in FIG. 5.

A certain empirical analogy may be noted here to the distribution of the modulation signals energy into sideband components, and to the subsequent restoration of the modulation signal from these sideband components in angle-modulation systems.

The statement that the filter of FIG. 6 operates as dispersion filter if the switches 52 and 55 are in their first position and as restoration filter if these switches are in their second position is not to be taken categeorematically. In fact, the filter of FIG. 6 may be used as the dispersion filter 12 when the switches 52 and 55 are in the position which is illustrated in dotted lines. In this case, the dispersion patterns 65 and 65' of FIG. 4, rather than the dispersion patterns 80 and 84 of FIG. 7, are provided by the filter of FIG. 6. This filter may then be operated as a restoration filter for deriving the restored signal components 62' and 63' from the dispersion patterns 65 and 65' by actuating the switches 52 and 55 to the position which is indicated by solid lines in FIG. 6.

It is thus seen that the dispersion filter may be the filter obtained on the basis of the above Bessel expansion, or may be an inverse replica of that obtained filter. Similarly, the restoration filter may be an inverse replica of the filter obtained on the basis of the above Bessel expansion, or may be that obtained filter itself. In either case, the restoration filter is an inverse replica of the dispersion filter.

Figure 8:
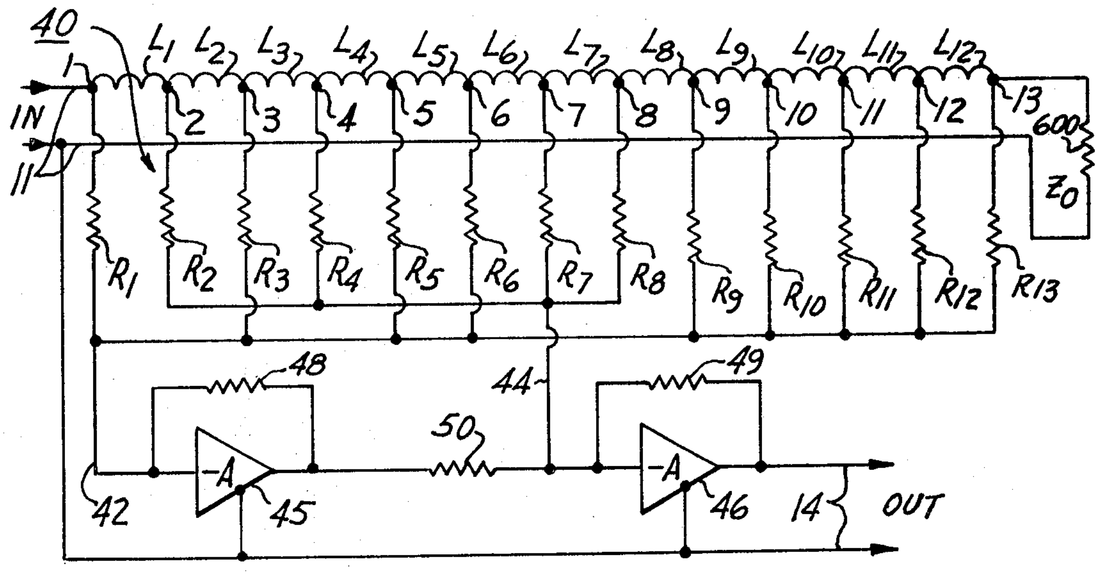
FIGS. 8 and 9 are diagrams of further filter circuits designed in accordance with preferred embodiments of the subject invention and useful in the system of FIGS. 1 and 2.
Figure 9:
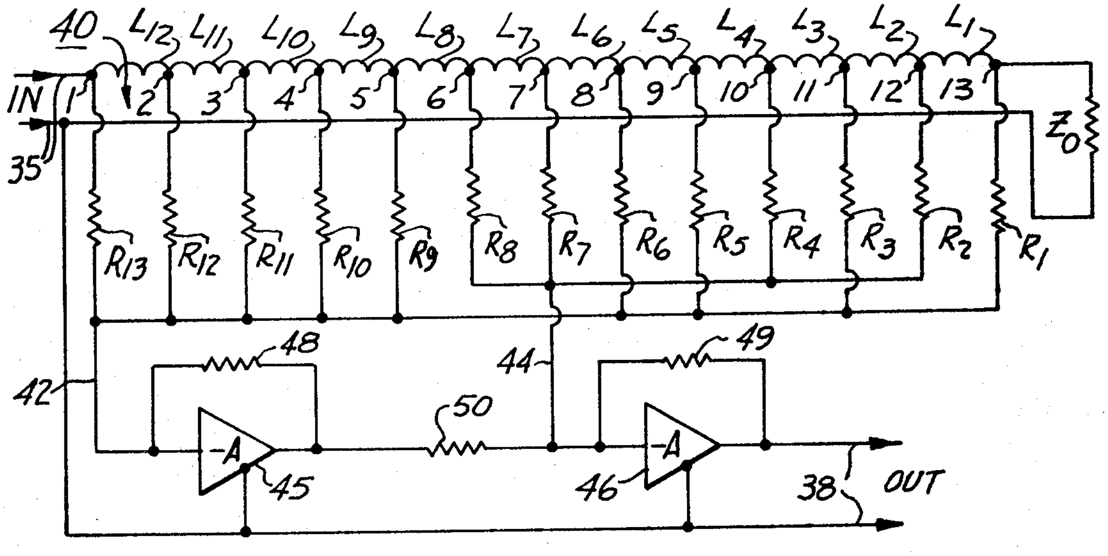

This applies also to the filters shown in FIGS. 8 and 9.

According to FIG. 8, the taps 1 through 13 of the filter illustrated therein are selectively connected to the amplifiers 45 and 46 in accordance with the above polarity table (13). According to FIG. 9, an inverse replica of the filter of FIG. 8 is obtained by connecting the termination resistor $Z_o$ to the delay line section $L_1$ and tap resistor $R_1$, and connecting the filter input 35 to the delay line section $L_{12}$ and tap resistor 13. If now the taps are numbered from 1 through 13 in the direction of signal flow along the delay line, then the polarity succession of the above tabulation (10) obtains. Comparing the tabulations (10) and (13), it may be seen that the filters of FIGS. 8 and 9 are inverse replicas of each other, and that they may be provided by changing termination resistor and input lead connections in one and the same filter structure.

The resistors $R_1$ through $R_{13}$ in the filters of FIGS. 8 and 9 may have the adjusted values given in the above tabulation (12). Since these filters are used with a direction of signal travel from $L_1$ through $L_{12}$ in one instance (see FIG. 8) and an opposite direction of signal travel from $L_{12}$ through $L_1$ in the other instance (see FIG. 9), it may however be found preferable in practice to select the resistors $R_1$ through $R_{13}$ in FIGS. 8 and 9 in accordance with the tabulation (11).

The filter of FIG. 8 may be used as the dispersion filter 12 in which case the dispersion patterns provided by the filter correspond to those shown in FIG. 4, and FIG. 9 shows the corresponding restoration filter 36.

Conversely, the filter of FIG. 9 may be used as the dispersion filter 12, in which case the dispersion patterns are substantially as illustrated in FIG. 7, and FIG. 8 shows the corresponding restoration filter 36.

The filters of FIGS. 8 and 9 together form a matched pair, since their phase-versus-frequency responses are substantially equal in magnitude but opposite in sign. The same applies to the filter of FIG. 6 with the switches 52 and 55 first in one position and then in the other position.

The filters according to the preferred embodiments of FIG. 6, 8 and 9 display a substantially flat amplitude-versus-frequency response, which is important for a high-quality restoration of the input signal. In their operation as dispersion filters, these filters impose different time delays as a function of the frequency of frequency components of the input bits of information, which improves the dispersion effect. The overall time delay of the dispersion and restoration filters in tandem is, however, constant since these filters have conjugate frequency responses as mentioned above.

Reverting at this juncture to the information recording process, it should be understood that the dispersion and restoration processes of the subject invention may be employed in conjunction with an amplitude or time modulation of the information signal. By way of example and not by way of limitation, the subject invention may be applied to video recording systems in which the video signal is angle or time modulated for recording purposes.

While the above filter design examples have primarily been described in analogy to frequency modulation, it should be understood that the dispersion and restoration filters may also be designed with the aid of mathematical analyses established for other types of angle modulation, such as phase modulation for which suitable background theory is provided in Goldman, pp. 151 and 152.

I claim:

1. Apparatus for producing a record of electric information signals, and for substantially reproducing said electric information signals from said record, comprising:
   a. filter means for dispersing successive elemental fractions of said information signals, including delay line means having taps weighted substantially in accordance with a function of $$J_n(K)$$

wherein
   $K$ is a predetermined constant,
   $J$ is a Bessel function of the first kind,
   $n$ designates Bessel function order, and
   $J_n(K)$ proceeds in accordance with Bessel coefficients of sideband components of angle-modulated signals;
   b. a recording medium;
   c. means connected to said filter means for recording said dispersed elemental fractions on said recording medium;
   d. means for playing back said dispersed elemental fractions from said recording medium, with said played-back dispersed elemental fractions including spurious signals of momentary duration; and
   e. means connected to said playback means for substantially restoring said electric information signals from said played-back dispersed elemental fractions, and for diffusing said spurious signals.

2. Apparatus as claimed in claim 1, wherein:
   said restoring means include further delay line means having taps weighted substantially in accordance with said function of $$J_n(K)$$

and presenting an inverse replica of said filter means.

3. Apparatus as claimed in claim 1, wherein:
   said filter means include selectively actuable means for converting said filter means into said restoring means.

4. Apparatus as claimed in claim 1, wherein said filter means include:
   resistors connected to said taps for weighting said taps in accordance with said function;
   first inverting amplifier means connected to first predetermined ones of said resistors for realizing negative values of said function; and
   second inverting amplifier means connected between second predetermined ones of said resistor and said first inverting amplifier means for realizing positive values of said function.

5. Apparatus as claimed in claim 4, wherein said filter means include:
   selectively actuable means for converting said filter means into said restoring means by changing predetermined connections between said first and second resistors and said first and second amplifier means.

6. Apparatus for producing a record of electric information signals, and for substantially reproducing said electric information signals from said record, comprising:
   a. filter means for dispersing successive elemental fractions of said information signals;
   b. a recording medium;
   c. means connected to said filter means for recording said dispersed elemental fractions on said recording medium;
   d. means for playing back said dispersed elemental fractions from said recording medium, with said played-back dispersed elemental fractions including spurious signals of momentary duration; and
   e. means connected to said playback means for substantially restoring said electric information signals from said played-back dispersed elemental fractions, and for diffusing said spurious signals; with
   f. said restoring means including delay-line filter means having delay line means including taps weighted substantially in accordance with a function of $$J_n(K)$$

wherein
   $K$ is a predetermined constant,
   J is a Bessel function of the first kind,
   $n$ designates Bessel function order, and $J_n(K)$ proceeds in accordance with Bessel coefficients of sideband components of angle-modulated signals; and
   g. said filter means for dispersing successive elemental fractions constituting an inverse replica of said delay-line filter means.

7. Apparatus as claimed in claim 6, wherein:

said delay-line filter means include selectively actuable means for selectively converting said delay-line filter means into said inverse replica filter means.

* * * * *

PO-1050
(5/69)

UNITED STATES PATENT OFFICE
CERTIFICATE OF CORRECTION

Patent No. 3,651,277 Dated March 21, 1972

Inventor(s) Wayne Kassell Hodder

It is certified that error appears in the above-identified patent and that said Letters Patent are hereby corrected as shown below:

Column 4, line 24, "Mathematicallyit" should be --Mathematically it--. Column 5, line 4, "radiofrequency" should be --radio-frequency--.
Column 5, line 68 should be
--$+J_6(K)\sin[\omega(t+6T)]+J_6(K)\sin[\omega(t-6T)]\ldots$, etc.--.

Signed and sealed this 12th day of February 1974.

(SEAL)
Attest:

EDWARD M.FLETCHER,JR.
Attesting Officer

C. MARSHALL DANN
Commissioner of Patents